United States Patent [19]
Evans et al.

[11] 3,990,395
[45] Nov. 9, 1976

[54] APPARATUS FOR FORMING INSULATING MATERIAL OVER AN ELECTRODE CAN

[75] Inventors: William J. Evans, Indianapolis; Edwin R. Koons, Whiteland; Kevin J. Killigrew, Noblesville, all of Ind.

[73] Assignee: P. R. Mallory & Co., Inc., Indianapolis, Ind.

[22] Filed: Dec. 30, 1974

[21] Appl. No.: 537,275

[52] U.S. Cl. .............................. 118/642; 118/107; 118/109; 118/264; 118/416
[51] Int. Cl.² ...................... B05C 3/02; B05C 11/02
[58] Field of Search ........... 118/232, 107, 233, 109, 118/264, 416, 267, 429, 642; 228/35; 427/429

[56] References Cited
UNITED STATES PATENTS

| | | | |
|---|---|---|---|
| 831,905 | 9/1906 | Thom | 228/35 X |
| 935,229 | 9/1909 | Phelps | 228/35 |
| 2,468,922 | 5/1949 | Cook | 118/232 X |
| 2,808,806 | 10/1957 | Tysinger | 118/232 X |
| 3,394,680 | 7/1968 | Groves | 118/232 |
| 3,479,200 | 11/1969 | Estabrooks | 118/416 X |

Primary Examiner—John P. McIntosh
Attorney, Agent, or Firm—Hoffmann, Meyer & Hanson

[57] ABSTRACT

An apparatus for forming an electrically insulating semi-cured or cured in situ polymer containing material over a surface of an electrode can of an electrical device. The apparatus includes an applicator forming a film of curable polymer containing material over the can and means semi-curing or curing in situ the film to form an electrically insulating semi-cured or cured polymer containing material over the surface of the electrode can. The film is formed by contacting a surface of the electrode can with curable polymer containing material dispensed from the applicator and moving the surface of the electrode can contacted with the material over the applicator to distribute the curable polymer containing material over the surface of the electrode can as a film.

7 Claims, 3 Drawing Figures

APPARATUS FOR FORMING INSULATING MATERIAL OVER AN ELECTRODE CAN

The present invention relates to an apparatus for forming a film over an electrical device. More particularly, the present invention relates to an apparatus for forming an electrically insulating semi-cured or cured in situ polymer containing material over an electrode can.

As shown in U.S. Pat. No. 3,040,385, the can of an electrical device, such as a capacitor, may be jacketed with an insulating sleeve in order to provide a thermal and an electrical barrier between the capacitor can and its surroundings. Generally speaking, the sleeve includes a plurality of overlapped helically wound layers of oriented polyethylene and ethylene terephthalate. A capacitor can is inserted into the sleeve and the sleeve is heated to a temperature to shrink the ethylene terephthalate radially inwardly to provide a tight fitting sleeve over the capacitor can. It is intended that the tight fitting sleeve over the capacitor can form a thermal and electrical barrier between the can and its surroundings. If the shrinkage temperature is too high, the sleeve may harmfully degrade and be discontinuous. The area of the sleeve over edges of the can may thin or form discontinuities during shrinkage thereby harmfully affecting the desired thermal and electrical barrier characteristics of the sleeve in the area of the edges of the can. A discontinuity in the sleeve may provide a path through with harmful amounts of electrical current may flow. If such current flow has sufficient energy associated with it, it may cause a disruptive discharge containing sufficient energy to cause damage to adjacent objects or ingnition of a surrounding ignitable atmosphere. At the very least, such a harmful current flow tends to have a harmful effect on the electrical characteristics of the capacitor. Materials which have been substituted for the helically wound layers of oriented polyethylene and terephthalate include heat shrinkable polyvinyl chloride sleeves and polyester terephthalate sleeves.

One aspect of the present invention relates to an apparatus for forming an electrically insulating semi-cured or cured in situ polymer containing material over a surface of an electrode can to minimize the possibility of a current path created between the electrode can and its surrounding environment of a nature having a harmful effect on the surrounding environment or the electrical characteristics of the electrical device. Preferably, the polymer containing material is cross-linked or cured by exposure to high energy irradiation such as ultraviolet (UV) light or electron beam (EB) irradiation. An advantage of irradiation semi-cured or cured material over heat shrunken material is that irradiation semi-cured or cured material over the electrode provides a substantially continuous layer having a breakdown voltage of about 2000 volts DC or higher. The irradiated semi-cured or cured material does not appear to be harmfully affected by thermal cycling experienced by the electrical device, such as a capacitor, under typical operating conditions.

It is, therefore, a feature of the present invention to provide an apparatus for forming an electrically insulating radiation semi-cured or cured material over an electrode can to minimize the possibility of creating a current path that may have a harmful effect on the electrical characteristics of the electrical device or on the surroundings of the device. A further feature of the present invention is to provide an apparatus for forming a film of curable polymer containing material over the surface of the electrode can be contacting the surface of the electrode can with curable polymer containing material dispensed from an applicator and moving the surface of the electrode can contacted with the material over the applicator to distribute the curable polymer containing material over the surface of the can as a film.

Conventional techniques (such as hand brushing, immersing, or spraying) of applying curable polymer containing material to an electrode can are not acceptable. Hand brushing the material over the electrode can tends to result in a film having sags or droops in it. The sags in the film indicate that too much material has been applied to the electrode can thereby resulting in waste of material. Hand brushing the material over an electrode can results in a film having a substantially non-uniform thickness. Immersing the electrode can in a bath of the curable polymer material also has problems associated with it. Leads projecting from the electrical device including an electrode can must be masked in order not to form a layer of the electrically insulating material over the leads. In addition, a film with sags or droops in it tends to result using an immersion technique. Spraying with air spray guns provides a more uniform film than does either hand brushing or immersion and reduces labor costs over brushing. However, spraying is extremely wasteful of polymer containing material. Much of the material sprayed, rather than being deposited on the electrode can, is carried past the can and lost as overspray. Overspray represents a waste of material, is a potential health hazard, and may require the use of relatively expensive overspray collecting equipment to prevent contamination of the factory area. In spraying with air spray guns, it has been estimated that as such as 75% of the material may be lost as overspray. In addition, there is some difficulty in maintaining the material at the required viscosity so as to use air-spraying techniques.

It was determined that the use of the disclosed apparatus for forming an electrically insulating film over an electrode can resulted in a film of substantially uniform thickness with little, if any, sags and no overspray yet had the labor costs typically associated with an air-spray operation.

Figure 1:
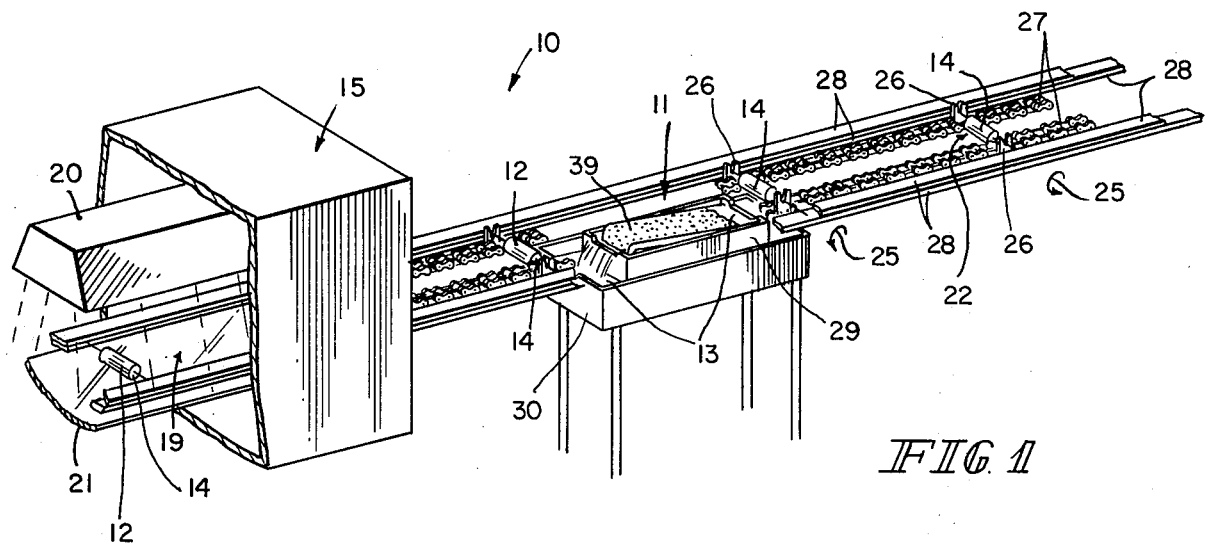
FIG. 1 is a diagrammatic illustration of an apparatus for forming a film of curable polymer containing material over an electrode can of an electrical device and for irradiating the film to cross-link or cure the material in situ.
Figure 2:
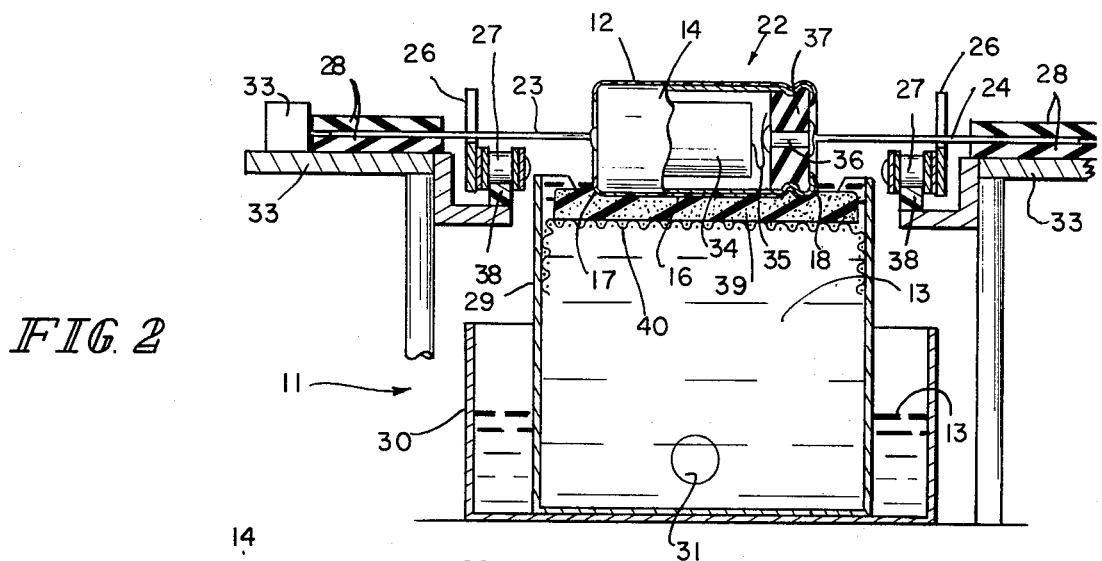
FIG. 2 is a transverse section view, with portions thereof broken away, of the applicator of the apparatus shown in FIG. 1.

An illustration embodying one form of the concepts of the present invention is shown in FIG. 1. An apparatus 10 is shown including applicator 11 for forming a film 12 of irradiation curable polymer containing material 13 over an electrode can 14 and means 15 for semi-curing or curing the film 12 in situ to form an electrically insulating semi-cured or cured polymer containing material over the electrode can. The formation of the film 12 of the irradiation curable material 13 over electrode can 14 is accomplished by contacting the electrode can 14 with curable material 13 dispensed from the applicator 11 and moving the electrode can 14 contacted with the curable material 13 over the applicator 11 to distribute the curable material 13 over the electrode can as a film 12. The length of time required to form the desired amount of curable material 13 as film 12 over a side 16 and edges 17 and 18 of the electrode can 14 as shown in FIG. 2 is a function of the viscosity of the material 13. The viscosity of the radiation curable polymeric material 13 may be varied to help control thickness of the film 12 formed over the electrode can 14 including side 16 and edges 17 and 18.

The electrode can 14 with curable film 12 is transported from the applicator 11 to means 15 including cross-linking or curing zone 19. The electrode can 14 together with the irradiation curable film 12 formed over the can including side 16, and edges 17 and 18 is passed through radiation cross-linking or curing zone 19. In zone 19 is an ultraviolet light source 20 for causing cross-linking of the material 13 of the film 12 and, optionally, a reflector 21 to reflect back toward the electrode can 14 ultraviolet light that initially passed by the electrode can 14. Ultraviolet light having a radiation in the wavelength range of about 3600 to 3700 Angstrom (A) is emitted by source 20. A control panel (not shown) may be employed to regulate the "on" and "off" time of the ultraviolet light emitted by the source 20. An ultraviolet light source 20 such as high pressure mercury lamp source suitably causes curing of, in a few seconds, a film 12 of curable material 13 having a thickness of up to 10 mils formed over the electrode can 14. The distance between the source 20 and the exposed film 12 of material 13 formed over the electrode can 14 is about 9 to 14 inches. If desired, the electrode can 14 may be rotated about its axis while in front of source 20 in order to aid in more uniformly cross-linking the film 12 of the curable material 13.

The curable polymeric material 13 formed as a film 12 over the electrode can 14 may be any one of several suitable cross-linkable polymer containing materials having high electrical resistance, good resistance to chemical solvents and that forms a film 12 of substantially uniform thickness over the can 14. For example, if ultraviolet light is used to cross-link the film 12 of polymer containing material, suitable materials may be unsaturated polyesters, thermosetting acrylics, and urethane alkyds typically mixed with reactive monomers such as styrene, vinyl toluene or acrylics, and a suitable initiator. In the event electron beam radiation is used to cross-link the applied polymeric material 13 suitable materials may be unsaturated polyester, thermosetting and thermoplastic acrylics, urethanes and the like. It may be possible to modify the polyesters, acrylics and urethanes with epoxy, vinyl, silicone, fluorocarbons, polymers and the like. Typical monomers may include styrene, vinyl toluene, acrylics and the like.

In the use of an electron beam to cross-link the applied polymeric material 13, the electron beam bombards the polymer with high energy electrons.

The construction of the electrical device 22 shown in FIG. 2 may vary and its electrode can shape 14 may vary widely. The species of electrical device 22 shown in FIG. 2 of the drawing is liquid electrolytic aluminum capacitor of the type marketed by P. R. Mallory & Co. Inc. of Indianapolis, Ind., U.S.A. under type designation TT. Other types of capacitor marketed by P. R. Mallory & Co. Inc. which lend themselves to the concepts of the present invention include type designations TPG, TCW and TCG. Other types of electrical devices using electrode cans may have such cans covered with a film 12 as described herein.

The following example is typical of an electrode can 14 treated using the means 10 of the drawing

EXAMPLE

An TT type axial lead aluminum electrolytic capacitor 22 with an aluminum electrode can 14 of the configuration shown in FIG. 2 is degreased and its axial leads 23 and 24 are sufficiently straightened in order to aid in rotating the electrode can 14 in the direction of arrow 25 shown in FIG. 1 while the material 13 is formed as a film 12 over the electrode can 14 and while the film 12 irradiated in zone 19. Capacitor 22 with electrode can 14 is moved at the rate of about 7 feet per minute by the cooperation association of axial lead holder 26 and chain drive means 27. The electrode can 14 is in contact with applicator 11 for a sufficient length of time to apply a curable film 12 having a thickness of 0.005 to 0.015 inch to the surface 16 and edges 17 and 18 of the electrode can 14. It is preferable to form the film 12 over can 14 using at least two separate film forming and curing steps to build up the film to the desired thickness to withstand a breakdown voltage of about 2000 volts DC or higher. A single application of film 12 to can 14 tends to have voids formed therein. A further film 12 over an already formed film 12 tends to minimize the affects of voids formed in any one of the films 12. The material tends to form a film 12 of substantially uniform thickness over the can 14, including over the edges 17 and 18 of the electrode can 14 to help join the semi-cured or cured material 13 of the film 12 to the can. Note that the film 12 is spaced from the axial leads 23 and 24 of the electrical device 22. The film 12 may contact the sides of the axial leads 23 and 24, if desired. The material 13 is an ultraviolet light cross-linkable material is sold under type designation 911-L by W. R. Grace & Co. of Columbia, Md., U.S.A. A capacitor 22 with its electrode can 14 and curable film 12 is irradiated by ultraviolet light source 20 having a wavelength of about 3600 to about 3700 Angstrom (A) for up to about 30 seconds. The exposure of the material 13 of film 12 to the ultraviolet cross-links the polymer containing material and provides the capacitor body 22 with a substantially continuous covering having a thickness of 0.005 to 0.007 inch. A film 12 of two layers of 0.005 to 0.007 of an inch thick each has good electrical insulation properties and functions to help provide electrical insulation of the can electrode 14 from its surrounding environment. A dye or pigment may be added to material 13 so long as the dye or dyes do not harmfully affect the ability of the material to cross-link when subjected to ultraviolet light.

The film 12 over the electrode can 14 appears to be of substantially uniform thickness and closely follows the contour of the can so as to provide a tight fitting film over side 16 and edges 17 and 18 of the can. The dielectric breakdown voltage of a two layer film 12 is in excess of 2000 volts DC. The film 12 does not easily peel from the electrode can 14.

Figure 3:
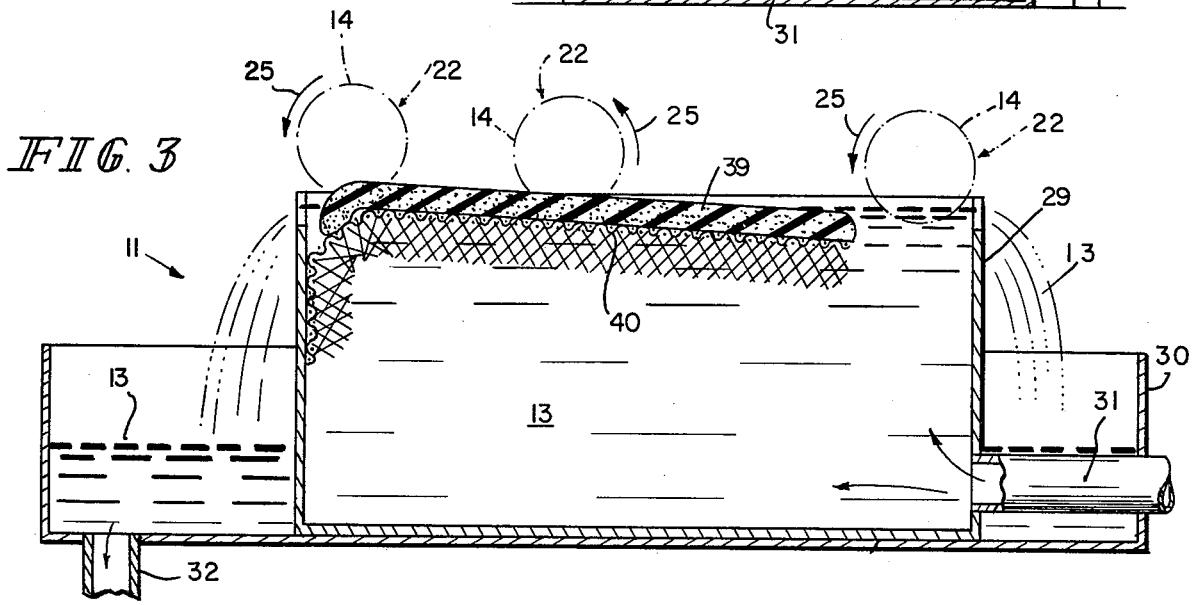
FIG. 3 is a longitudinal section view, with portions thereof broken away, of the applicator of the apparatus shown in FIG. 1.

The applicator 11 for forming a film 12 of irradiation curable polymer containing material 13 over the electrode can 14 is illustrated in the several FIGURES of the drawing. Referring to FIGS. 2 and 3, the applicator 11 includes axial lead holders 26 driven in a forward direction by chain drive means 27, a plurality of belts 28 for engaging with the axial leads 23 and 24 to rotate the electrical device 22, bath 29 containing maaterial 13, means 39 for contacting the electrode can 14 of the electrical device to distribute the curable material 13 over the electrode can as film 12 and vessel 30 to help recirculate curable material 13 overflowed from bath 29.

As shown in FIGS. 1 and 2 of the drawing, an electrical device 22 is placed adjacent axial lead holders 26 so that axial lead 23 is seated in one holder 26 and axial lead 24 is seated in the adjacent axial holder 26. Axial lead 23 extends from axial lead holder 26 to between belts 28 as shown in FIG. 2. One of the belts 28 is moved at a faster rate than the other belt 28 engaging the axial lead 23. Each of the belts 28 frictionally engages with the axial lead 23. Axial lead 24 extends from axial lead holder 26 to between belts 28 as shown in FIG. 2. One of such belts is moved at a faster rate than the other belt engaging with the axial lead 24. Each of the belts 28 frictionally engages with the axial lead 24. The relationship between the speeds of the belts 28 and their frictional engagement with axial leads 23 and 24 cause rotation of the electrode can 14 of the electrical device 22 in the direction of arrow 25 as illustrated in FIGS. 1 and 3. The axial lead holders 26 are moved in a forward direction by chain drive means 27 while the belts 28 cause the electrical device 22 to be rotated in the direction of arrow 25.

Bath 29 of curable material 13 and means 39 for distributing the curable material over the electrode can 14 as a film 12. The bath 29 is filled to an overflow condition with curable polymer containing material 13. Overflowed material 13 is caught by vessel 30 in which bath 29 is seated. Substantially uncontaminated curable material 13 is fed to bath 29 through inlet 31. Overflowed curable material 13 is recirculated to inlet 31 of bath 29 via outlet 32 by a pump (not shown) and conduit (not shown) between the inlet 31 and the outlet 32.

An electrode can 14 of an electrical device 22 engages with the surface of the curable material 13 in bath 29 as shown in FIG. 3 in order to apply material 13 to a portion of the surface 16 of the electrode can 14. In order to distribute curable material 13 over the surface 16 and edges 17 and 18 of the electrode can 14, the can is contacted by and moved over an elastic porous mass 39. The elastic mass 39 distributes the curable material 13 as a film 12 over the surface 16 and edges 17 and 18 of the electrode can 14. The length of the elastic porous mass 39 is sufficient so that the entire peripheral length of the surface 16 of the electrode can 14 is caused to contact the mass 39. The width of the elastic porous mass 39 is such that the edges 17 and 18 of the electrode can 14 may be simultaneously accommodated. The elastic mass 39 is porous so as to, among other things, help remove excess curable material 13 from surface 16 of the electrode can 14 or, alternatively, to apply curable material 13 to the surface 16 of the electrode can. A suitable elastic porous mass 39 is a sponge. The elastic porous mass 39 is slightly inclined with respect to the level of the curable material 13 in the bath 29 so as to help accommodate slight variations in the position of the electrode can 14 with respect to elastic porous mass. The elastic porous mass 39 is supported in bath 29 by wire screen 40. Screen 40 is fixed to bath 29 at one end and free in the bath at the opposite end.

Guides 33 are used to guide and support belts 28. Tracks 38 are used to guide and support chain drive 27.

The TT type capacitor shown in FIG. 2 includes a body 34 of convolutely wound anode and cathode aluminum foil electrodes (not shown) separated by a suitable means (not shown). The body 34 is impregnated with electrolyte (not shown). An anode tab 35 projects from the body 34 and contacts rivet 36. Rivet 36 extends through electrically insulating gasket 37. The anode axial lead 24 contacts rivet 36 as shown FIG. 2. The gasket 37 may be retained in place with respect to the electrode can 14 by crimping or rolling over edge 18 of the electrode can. A cathode tab (not shown) projects from the body 34 and contacts the electrode can 14. Axial lead 23 is attached to the electrode can 14.

The electrical device 22 shown in FIG. 2 is only illustrative of the wide range of electrical devices using electrode cans 14 which may use the concepts of the present invention. For example, a tantalum capacitor having a wet or solid electrolyte may have a film 12 over its electrode can. A solid tantalum capacitor having an electrode can 14 is a TAS type capacitor marketed by P. R. Mallory & Co. Inc. A wet tantalum capacitor having an electrode can 14 is a TLS type capacitor marketed by P. R. Mallor & Co. Inc. Forming a film 12 over other types of electrical devices having electrode cans will be apparent to one skilled in electrical components.

What is claimed is:
1. An apparatus for forming an electrically insulating semi-cured or cured in situ polymer containing material over a surface of an electrode can of an electrical device, the apparatus comprising an applicator means, curing means and transporting means capable of moving electrode cans along a path over the applicator means and into the curing means, the applicator means adjacent to the transporting means and beneath the path of the electrode cans, the applicator means including an over flow type bath for contacting the surfaces of electrode cans with liquid polymer containing material and an elastic porous mass having an essentially flat surface, the flat surface inclined with respect to the path of the electrode cans and adapted for contacting the electrode cans and thereby distributing the liquid polymer containing material over the surfaces of the electrode cans as a film, and the curing means capable of semi-curing or curing in situ the film to form an electrically insulating semi-cured or cured polymer containing material over the surface of the electrode can.

2. The apparatus of claim 1, wherein the curing means includes means irradiating the film of polymer containing material for a sufficient length of time to semi-cure or cure the polymer containing material.

3. The apparatus of claim 1, wherein the elastic porous mass is a sponge-like mass.

4. The apparatus of claim 1, wherein the applicator includes means for rotating the electrode can while the material is being distributed over the surface of the electrode can.

5. The apparatus of claim 4, wherein the means for rotating the electrode can includes belts moving at different speeds in contact with the electrode can.

6. The apparatus of claim 5, wherein the belts rotate the electrode can of the electrical device by contacting leads extending from the electrical device.

7. The apparatus of claim 1, wherein the overflow type bath contains the elastic porous mass for distributing the liquid polymer containing material over a surface of an electrode can as a film.

* * * * *